United States Patent
Berrill

(10) Patent No.: US 8,200,005 B2
(45) Date of Patent: Jun. 12, 2012

(54) METHOD AND APPARATUS FOR STORING 3D INFORMATION WITH RASTER IMAGERY

(75) Inventor: Arthur R. Berrill, Ontario (CA)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 12/946,954

(22) Filed: Nov. 16, 2010

(65) Prior Publication Data

US 2011/0058732 A1    Mar. 10, 2011

Related U.S. Application Data

(63) Continuation of application No. 12/706,857, filed on Feb. 17, 2010, now Pat. No. 7,853,070, which is a continuation of application No. 11/390,065, filed on Mar. 28, 2006, now Pat. No. 7,684,612.

(51) Int. Cl.
*G06K 9/00* (2006.01)

(52) U.S. Cl. .................................................. 382/154
(58) Field of Classification Search ............... 382/151, 382/154, 165, 232, 284; 345/419–420
See application file for complete search history.

(56) References Cited

U.S. PATENT DOCUMENTS

| | | |
|---|---|---|
| 2004/0041905 A1 | 3/2004 | Shibayama |
| 2007/0237386 A1 | 10/2007 | Berrill |

*Primary Examiner* — Daniel Mariam
(74) *Attorney, Agent, or Firm* — Michael J. Cummings; Charles R. Malandra, Jr.; Steven J. Shapiro

(57) ABSTRACT

The present invention meets the above-stated needs by providing a method and apparatus that allows for X parallax information to be stored within an image pixel information. Consequently, only one image need be stored, whether it's a mosaic of a number of images, a single image or a partial image for proper reconstruction. To accomplish this, the present invention stores an X parallax value between the stereoscopic images with the typical pixel information by, e.g., increasing the pixel depth.

10 Claims, 6 Drawing Sheets

METHOD AND APPARATUS FOR STORING 3D INFORMATION WITH RASTER IMAGERY

RELATED APPLICATION

The present application is a continuation of U.S. patent application Ser. No. 12/706,857, filed Feb. 17, 2010 which is a continuation of U.S. application Ser. No. 11/390,065, filed Mar. 28, 2006, and assigned to the assignee of the present invention.

FIELD OF THE INVENTION

This invention relates to photogrammetry and techniques for measuring two dimensional (2D) and three dimensional (3D) objects; more specifically to a method and apparatus for reconstructing and analyzing 2D or 3D images based on using only one image of the object

BACKGROUND OF THE INVENTION

In today's Geographic Information Systems (GIS) industry, it is now a common practice to extract Digital Elevation Models (DEMs) from stereo overlapping aerial photography by matching features between two images. Referring to FIG. 1, DEMs are maps representing the elevation of the land surface and normally form a regular grid of equally spaced surface coordinates. Traditionally DEM creation is done using photogrammetric equipment. Today's digital methods use digital image matching techniques (still with 2 or more images) to build the DEM more automatically. The extraction of height information from the images involves the removal of relative (between images) and absolute (using both images) variations of yaw, pitch and roll—also known in the photogrammetric industry as Kappa, Omega and Phi, respectively. In the photogrammetric discipline this process is referred to as relative and absolute orientation. Fully oriented image pairs retain one relative distortion. This distortion is the displacement of features in the direction of motion of the camera due to the differences in height of the objects being imaged. It is referred to as stereoscopic parallax or "X Parallax."

Once the flying height, the camera principal distance (also referred to as the focal distance) and the Mean Sea Level (MSL) are taken into consideration, the X parallax value reveals feature elevation. While the elevation throughout the stereo model created by the overlap of the two images is continuous, the DEM is normally computed (or sampled) in relation to a discrete grid of points. However, key shape changes of the terrain such as, e.g., break lines at the edges of an alpine road, or sharp drops in the bed of a river down a cascade may be completely missed by the sample points of the DEM. In water runoff studies, for example, such inaccuracies in the DEM information may result in models built from unusable data, rendering the models insignificant for their desired purpose. FIG. 2 illustrates the limited effectiveness of a DEM to represent the terrain.

It is now common for raster imagery to be stored in or referenced from a GIS system. The usual practice is to mosaic the images to a single corrected image, with the photogrammetric distortions removed, and then store them accordingly. The result is referred to as an orthophoto. Orthophotos can also be created directly from stereo pairs of images using the x parallax.

In many computer applications, these images are stored and manipulated in the form of raster image data, or in other words, data derived from breaking the images down into units called pixels, each specified by location and color. The result being that the raster imagery or complete mosaic of images are typically stored as an array of pixels. However, that pixel array is compressed, normalized or facetted, and eventually becomes a serialization of the pixel array. To recover the model of the terrain in three dimensions for analysis, either (a) both stereo images are stored and viewed using some stereo viewing device or (b) one image, mosaic or orthophoto is stored which is then draped over a DEM; approach (b) being the more usual approach as mentioned above. Method (a) requires that both images be stored. This represents twice the storage and since the images are of the same area or objects, is redundant storage in all respects except for the recovery of the 3rd dimension. Approach (b) has all of the challenges and disadvantages noted above. The ideal situation would be that the image need only be stored once as an orthophoto and in a near continuous store of height information (making the recreation possible when both images are stored), with the information being associated with a single image such that no important detail is lost in the reconstructed 3D model and no redundant information needs to be stored.

SUMMARY OF THE INVENTION

The present invention meets the above-stated needs by providing a method and apparatus that allows for X parallax information to be stored within an image's pixel information. Consequently, only one image need be stored for proper reconstruction, whether it is a mosaic of a number of images, a single image, or a partial image. To accomplish this, the present invention stores an X parallax value between the stereoscopic images with the typical pixel information by, e.g., increasing the pixel depth.

It is an object of the invention to provide a method of storing three-dimensional information comprising: acquiring a plurality of images; combining said plurality of images to form a single image, said single image comprising a plurality of pixels having pixel data; and storing X parallax information with said pixel data of the single image in a memory device containing pixel data of said plurality of pixels.

It is a further object of the invention to provide a computer readable storage medium containing a computer readable code for operating a computer to perform a method for storing stereoscopic information comprising: acquiring a plurality of images; combining said plurality of images to form a single image, said single image comprising a plurality of pixels having pixel data; and storing X parallax information with said pixel data of the single image in a memory device containing pixel data of said plurality of pixels.

It is a further object of the invention to provide a system for storing three dimensional information comprising: means for acquiring a plurality of images; means for combining said plurality of images to form a single image, said single image comprising a plurality of pixels having pixel data; and means for storing X parallax information with said pixel data of the single image in a memory device containing pixel data of said plurality of pixels.

It is a further object of the invention to provide an image structure comprising: an array of pixels, said array of pixels comprising a plurality of pixels, each of said plurality of pixels comprising pixel data and X parallax information in a memory device containing pixel data of said plurality of pixels.

It is a further object of the invention to provide a system for storing three dimensional information comprising: a processor coupled to an image structure, said image structure comprising: an array of pixels, said array of pixels comprising a plurality of pixels, each of said plurality of pixels comprising pixel data and X parallax information in a memory device containing pixel data of said plurality of pixels.

It is a further object of the invention to provide a computer program transmitted over a communication medium to a computer system, the computer system comprising memory, a storage device and a processor in communication with the memory and the storage device, the computer program causing the processor to perform the acts of: acquiring a plurality if images; combining said plurality of images to form a single image, said single image comprising a plurality of pixels having pixel data; and storing X parallax information with said pixel data of the single image in a memory device containing pixel data of said plurality of pixels.

BRIEF DESCRIPTION OF THE DRAWINGS

The foregoing and other advantages and features of the invention will become more apparent from the detailed description of exemplary embodiments provided below with reference to the accompanying drawings in which.

DETAILED DESCRIPTION OF AN EMBODIMENT OF THE INVENTION

This invention relates to the storage of an image and a method and apparatus that allows for the X Parallax information to be stored within an image along with pixel information. As a result, only one image would ever be stored within GIS systems, whether the image comprises a mosaic, a single exposure, an orthophoto or a partial image.

Figure 1:
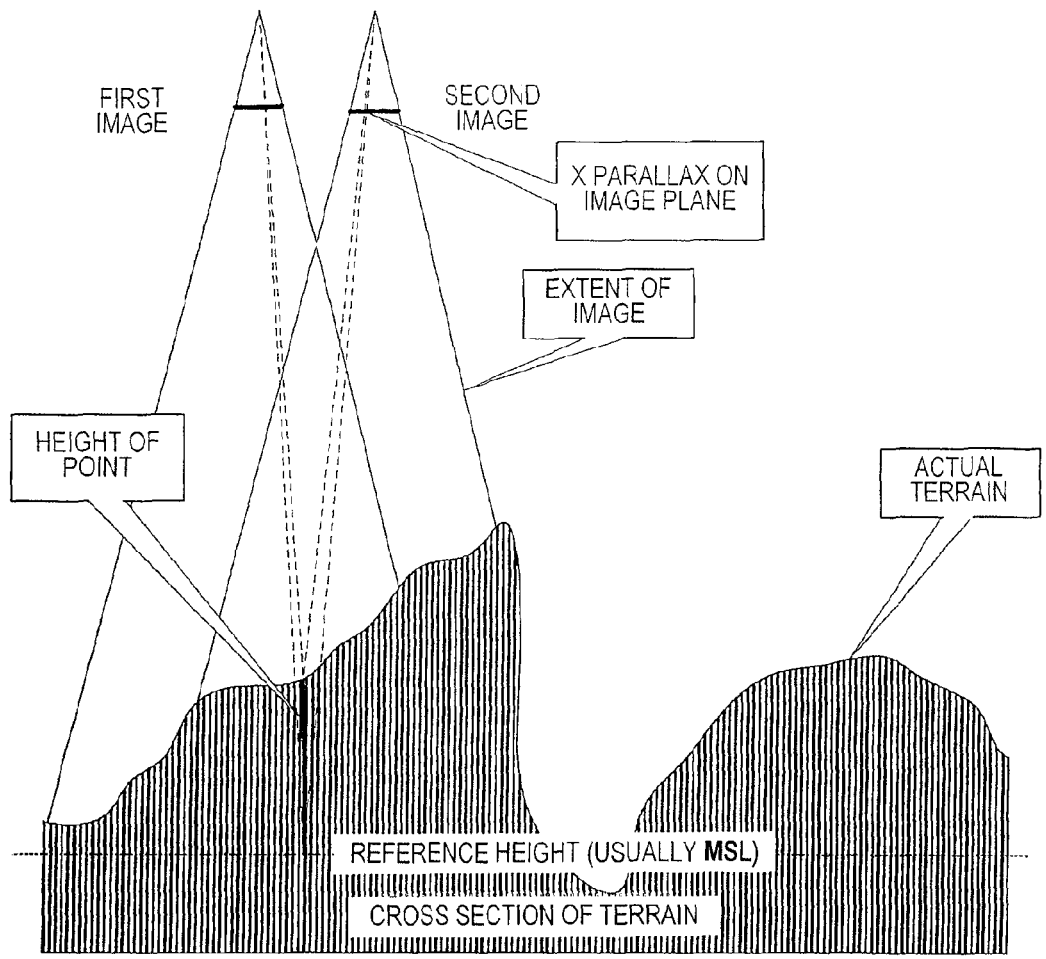
FIG. 1 is an illustration representing digital elevation models.
Figure 2:
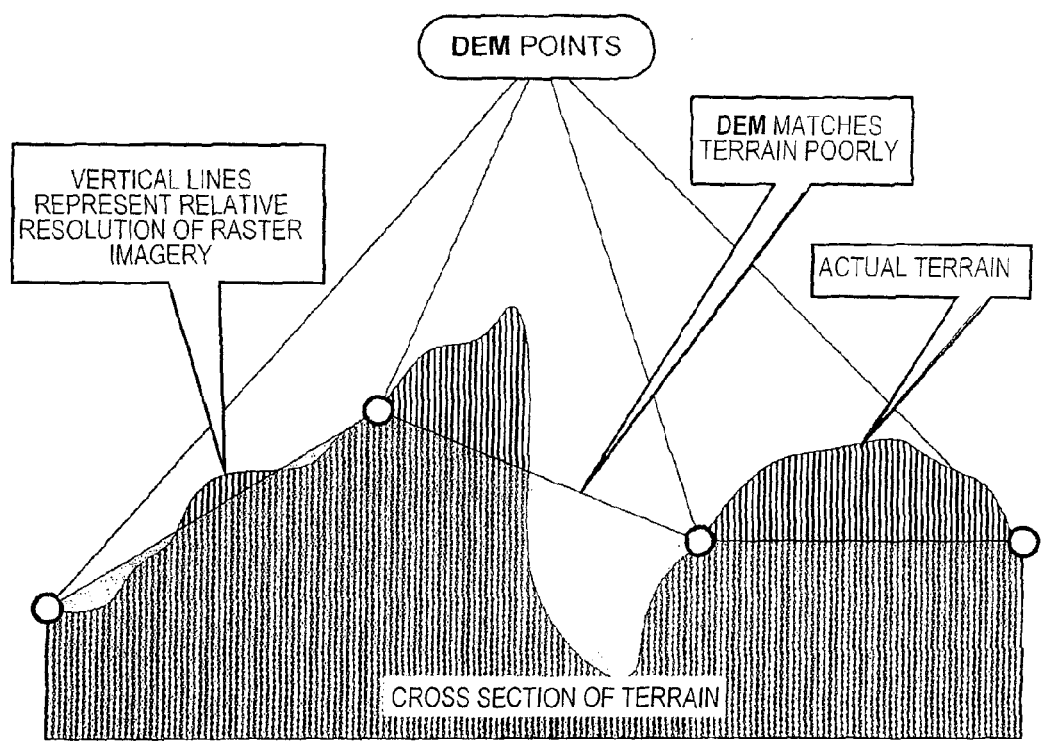
FIG. 2 is an illustration of a sample digital elevation model.
Figure 3:
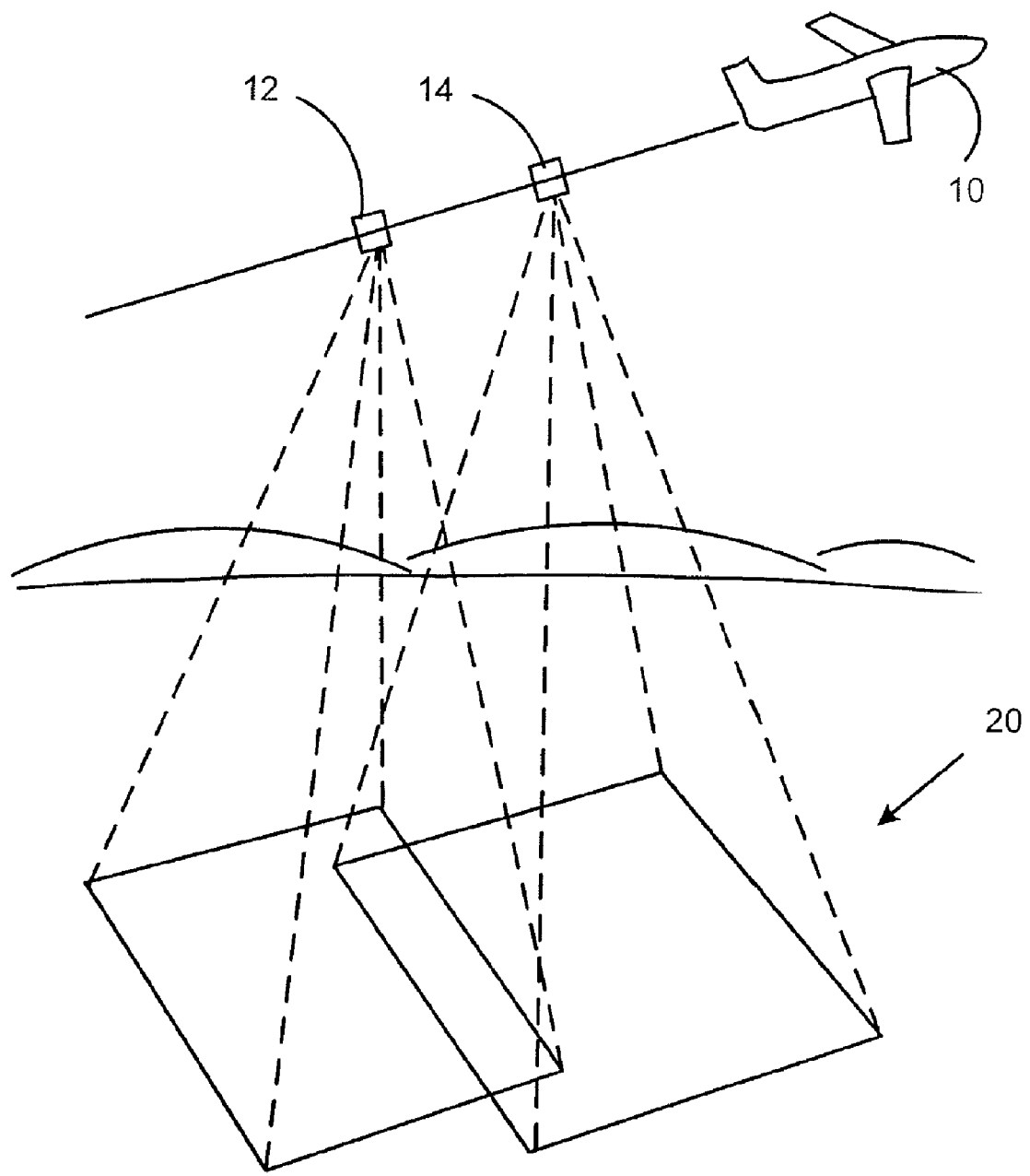
FIG. 3 is an illustration of the generation of a stereo pair of aerial photos as known in the prior art.

FIG. 3 is an illustration of the generation of a stereo pair of aerial photos. Referring to FIG. 3, X parallax is caused by a shift in the position of observation of objects of differing height. For example, to generate a stereo pair of aerial photos, a camera on board of an aircraft 10 takes pictures 12, 14 of the Earth 20 at different times and thus, from different positions. Another example includes a satellite generating image stereo pairs when the satellite collects data with two different look angles or two different beam positions. The change in observation points causes an apparent shift in the position of an object with respect to the image frame of reference.

Figure 4:
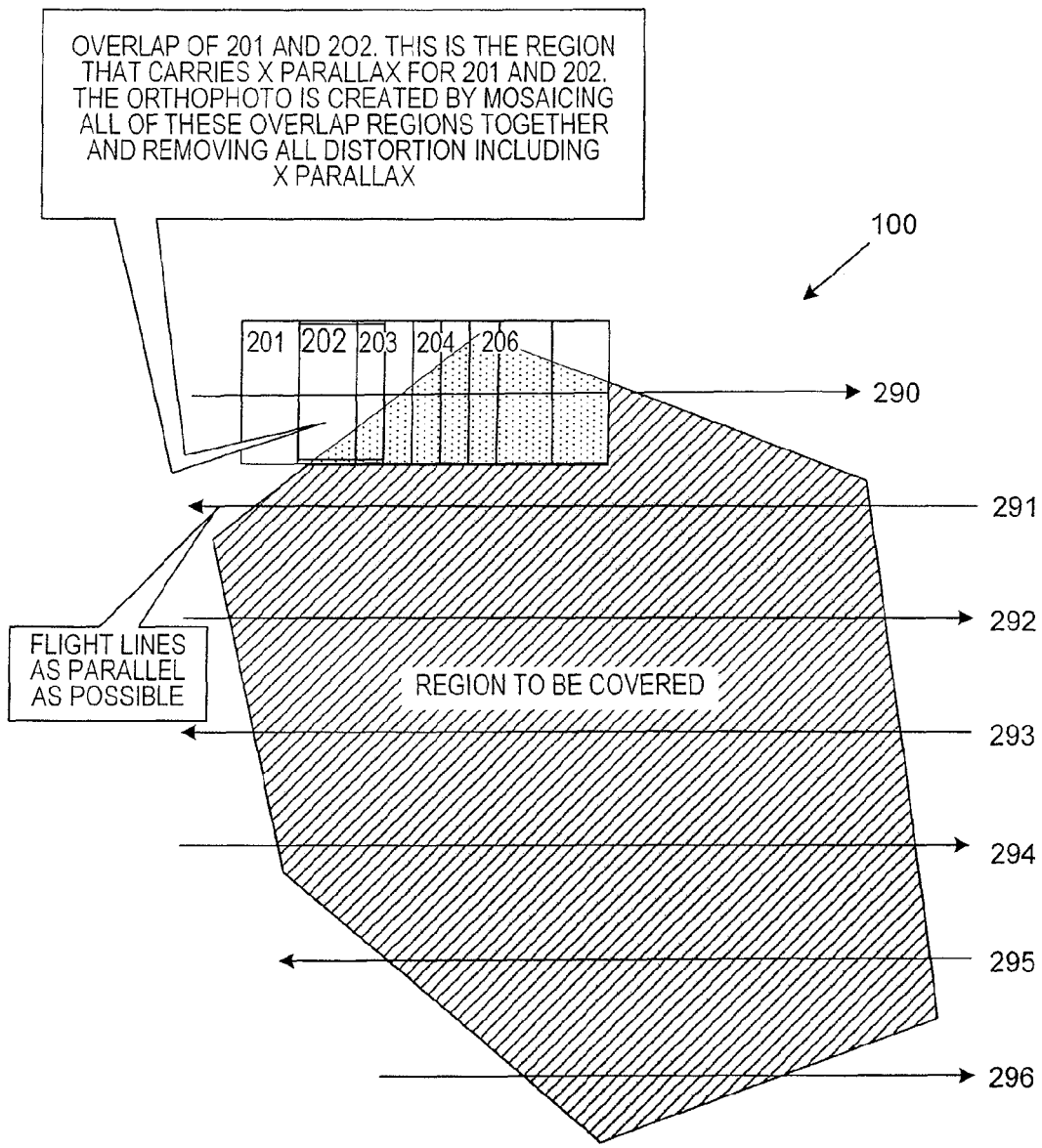
FIG. 4 is an illustration of an exemplary embodiment of the present invention.

FIG. 4 is an illustration of an exemplary embodiment of the present invention. FIG. 4 depicts input images 201, 202, 203, 204, 206 generated along one of the flight lines 290, 291, 292, 293, 294, 295, 296. The input images 201, 202, 203, 204, 206, as mentioned above, are a series of images, e.g., of a landscape, where each input image depicts the imaged subject matter from a different viewpoint. The input images are, typically, aligned and combined to form a single image.

The photogrammetric models exemplified in FIG. 4, by the overlap of images 201 to 202, for example, are usually corrected for X parallax at this time to form orthophotography which is then mosaiced together typically by matching edges so that the joins (the corresponding edges of the images) are not obvious. The orthophoto is created by mosaicing all of these overlap regions together and removing all distortion including X parallax. The essence of this invention is that at the time the orthophotography is created, pixel by pixel, the X parallax information (that was formerly used to correct the vertical exaggeration in the image) is recorded within the pixel along with the other pixel information. In other words, the X parallax information will be stored in the same field as the pixel information.

X Parallax is a differential quantity. Traditionally X parallax has never been stored. It is well known in the art to store images 201, 202, 203, 204, 206 in a storage device. The pixel information comprises pixel data, i.e., a location and color, and is stored in a memory device connected to each of the pixels. The orthorectification process (creation of the orthophoto) can involve the use of X parallax information derived from a stereo pair or height information from an established DEM to correct the image for height distortion. When the former process is used, the X parallax information is already available and could be stored as described. Otherwise, conventional software methods (e.g., Geomatica® from PCI geomatics) are needed and can be used to extract the X parallax information. The storage of X parallax information within the pixel itself would allow the re-creation of 3D objects without losing the accuracy of the re-created model.

Figure 5:
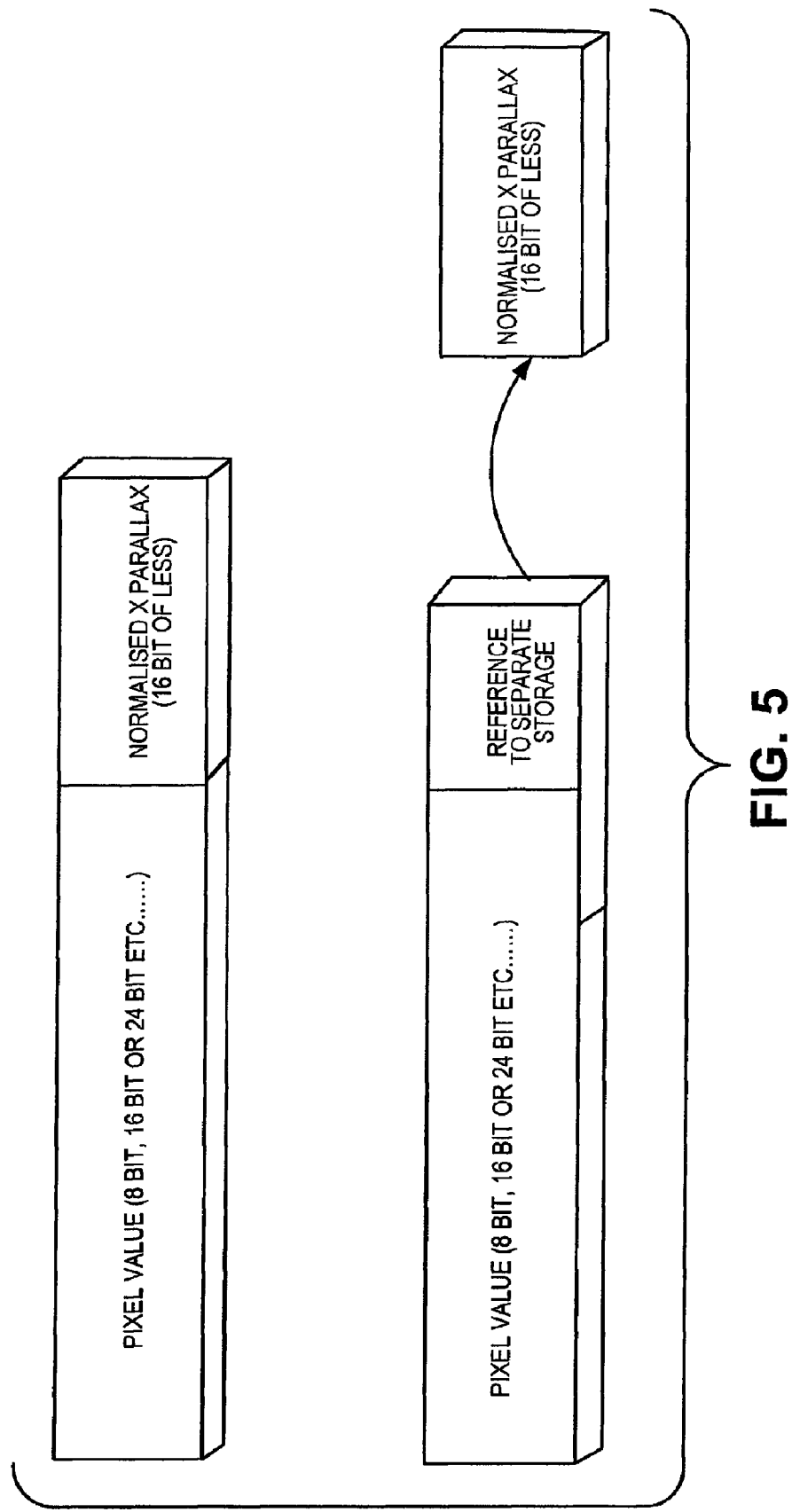
FIG. 5 is another illustration of the exemplary embodiment of the present invention.

Still referring to FIG. 4, the present invention eliminates the need to calculate the parallax information from selected image pairs or the need for storage of both images by storing the additional parallax information within the memory device containing the pixel information of the images 201, 202, 203, 204, 206. X parallax is typically expressed in a unit such as millimeters on the image. Depending on the region being photographed (flat or mountainous) the value can vary from as small as 0.001 mm (unmeasurable with most equipment) to as large as 10's of mm. If X parallax is "dx", then a reasonable normalized representation would be .fl000dx, which can be 9 stored in a 16 bit integer. It should be appreciated that it may be reasonable to reduce the number of bits involved from 16 since the range is typically limited. The inventor has discovered that storing X parallax information in every pixel of an image would not involve significant additional storage requirements. Referring to FIG. 5, X parallax information can be stored as an increase in pixel depth using the same traditional storage mechanisms. It is well known that pixels store pixel data such as the location and color. By expanding the pixel depth (i.e., number of bits in the pixel), a pixel not only allows for the additional storage of the X parallax information, but also allows the user to include additional bits of color, e.g. an additional 24 bits of color.

As alluded to above, the initial advantage of storing the X parallax information with the pixel information is that the reconstruction and display of the imagery in 3D becomes a simple request operation. All the needed 3D data necessary to reconstruct 3D imagery will be present in the imagery stream or cache requested and any competent 3D display engine can then easily take advantage of it. The traditional 3D display preparation engine takes the pixel data and the DEM and interpolates the height values for the individual pixels along the pixel rows. With the present invention, those heights are already present—they need only be denormalised and the actual height computed (which as FIG. 3 shows is simple trigonometry using the camera principal distance and flying height or could be a simple scale factor).

Further, with the X parallax information being held in the image itself, there is no longer a need for separate DEM storage and the process of draping is no longer necessary for raster imagery. Draping is the process of interpolating the heights of each pixel based on the point data from the DEM.

Since the X parallax information and the scale factor is already known to convert the value to a height, the process of draping becomes unnecessary. The result of the draping process is being stored by the present invention. Aside from the accuracy of the result, the present invention also reduces the display processing time related to the 3D image. Additionally, current 3D image display engines are capable of accepting the stream of data generated by the present invention with only minor preprocessing needed for rendering an image.

Beyond the storage and processing advantages presented by the invention, the invention also provides advantageous analytical capabilities. One of the most important aspects of location intelligence analysis using raster imagery is the detection of differences between images separated by time. For example, with the current availability of 143 megapixel cameras producing 2.3 gigabyte images per exposure point, and the likelihood of these specifications increasing, the detection of differences between images becomes crucially important even if only to rationalize the storage of captured data.

Using the present invention, the calculation of the algorithmic differences within the images can now include the elevation model since it is an integral part of both the storage and management mechanisms for the image data. At its most fundamental level, the calculation examines pixel by pixel the differences in the images. If the pixels are within a chosen tolerance of each other then no difference is flagged. The result of the calculation is usually another image that shows only the pixel differences and their values. Thus, the calculation can proceed essentially unaltered because the X parallax information is present in the pixel depth. X parallax is a scaled version of the height. For example, the raster difference between two images may reveal not only that a building has changed but that it has grown five stories higher. Without the integral X parallax information being an integral part of the image data, GIS systems' would only have been able to determine that the building has changed.

To generate the elevation differences using traditional methods, it would have required the generation of two discrete DEMs and the respective draping of the images. This is a multi-process sequence with built-in approximations and thus results in a number of inaccuracies. The present invention eliminates this cumbersome process and prevents the inaccuracies. For example, using the existing methods, the process would be extracting the two or more images corresponding to the region of interest, extracting the DEM from the region of interest, draping each image separately over the DEM to create heights for each of the pixel in the images, taking the two draped results 12 and registering them accurately, and running the differencing engine. It should be appreciated that it is essential and may require resampling to get the pixels of the images to coincide under the existing method. Under the present invention, where the X parallax information is retained with the image, the process will include extracting the two or more images for the corresponding region of interest, taking the two images and registering them accurately, and then running the differencing engine. It should also be appreciated that resampling may be required to get the pixels of the images to coincide under the present invention as well.

Another key advantage of the present invention is that the elevation information does not miss important features of the landscape as described above in relation to the prior art. An image draped over a DEM can show anomalies where the DEM has failed to represent a break line (for example, the edge of a cliff, ravine or railway embankment), but the image clearly implies such a characteristic. The present invention eliminates the need for the draping step because the X parallax information is stored.

Using the present invention, because the X parallax information is stored along with the imagery pixel information, it is reasonable to expect that the indexing will allow rapid 3D analysis. Therefore, it would be possible, for example, to request imagery for areas above a certain elevation. Additionally, in a more complex request, canopy signatures for areas above a certain elevation might be requested.

It is well known that DEMs may be stored for various aspects of a region. Also, a DEM may be stored for the canopy of the trees in the region. The present invention allows the storing of before and after images of a region subject to an event (e.g., a wildfire). The present invention makes it trivial to register two images (so that they overlap) and then take the differences not only in pixel values, but also the differences in X parallax values. Hence, under the present invention, a simple calculation will yield the volume of forest lost to a fire (or grown after the fire). It should be appreciated that the present invention can be extended to register and detect the differences as related to more than two images. For example, the combination of multiple images, e.g., three, four, five, etc. images, can thus be used to analyze growth rates of forestry as a whole.

It should be additionally appreciated that although the present invention has been described in relation to a number of examples, in no way do those examples limit the present invention. The present invention can be applied to any system, industry or field that deals with 2D or 3D raster imagery. The present invention can be applied in any analysis system relating to techniques for measuring and reconstructing 2D and 3D objects. It should also be appreciated that the manner in which the imagery is obtained, or the type of equipment used to obtain the imagery is also not limited to the above described examples.

Figure 6:
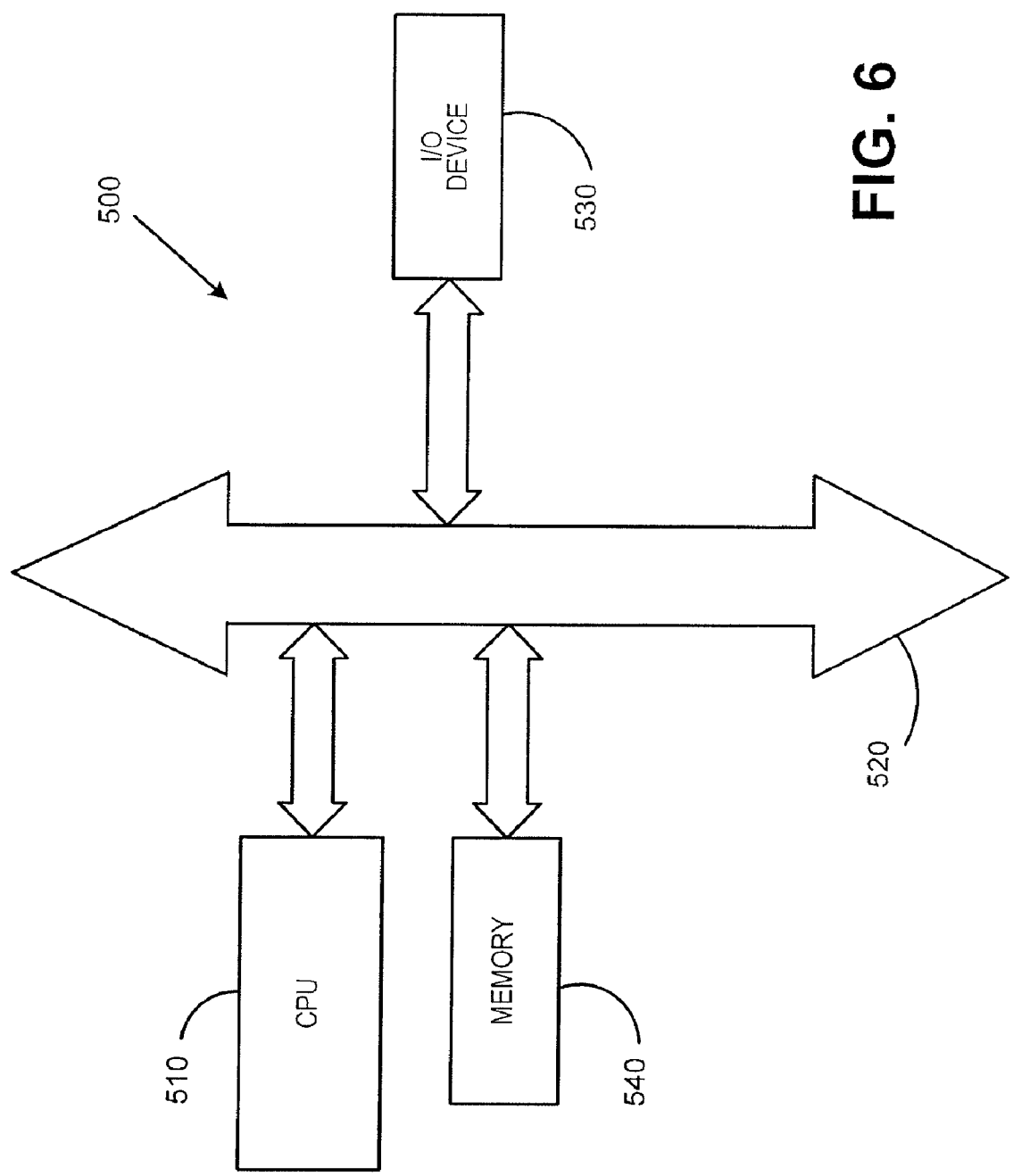
FIG. 6 is a processor system including the present invention.

FIG. 6 shows system 500, a typical processor system modified to include the system for storing X parallax information 100 of the present invention. Examples of processor systems, which may employ the system for storing X parallax information 100, include, without limitation, computer systems, machine vision systems, aircraft and/or vehicle navigation systems, video telephones, surveillance systems, and others.

There are current GIS systems that work with raster data such as GRASS. GRASS uses DEMs to create draped images for raster operations. GRASS does its GIS operations as a series of raster operations. With the X parallax information stored in the images, these operations can automatically take into account the elevation of the pixels. Consider, for example, a company that manages delivery of home heating oil. Such trucks are heavy and their efficiency of routing is important factor to the company's efficiency and delivery costs. When the truck is full early in its run, the route chosen should climb elevation as little as possible. It may even make sense that the truck take a longer route so long as its level or downhill when its laden. A fine grained height model such as afforded by imagery with X parallax information stored internally, such as provided by the present invention, would be instrumental is such routing plans. Trucks also need to deliver along unmapped private access lanes. Imagery is currently used from this problem as well, but is not possible with current DEMs to determine whether the truck will be able to navigate the bumps in the lane. A DEM will not show the bumps with great accuracy. However, a height model such as the one afforded by imagery provided by the present invention, would have the capability to provide images with such detail to cure this problem.

System 500 includes a central processing unit (CPU) 510 that communicates with various devices over a bus 520. Some of the devices connected to the bus 520 provide communication into and out of the system 500, illustratively including an input/output (I/O) device 530 and system for displaying information 100. Other devices connected to the bus 520 provide memory, illustratively including a CPU 510 incorporating the system for storing X parallax information 100 illustrated in FIG. 4. While one input/output device 530 is shown, there may be multiple I/O devices such as a CD-ROM, hard drive, floppy disk, display, and keyboard as well as others. The system for storing X parallax information 100 may also be combined with a processor, such as a memory, digital signal processor, or microprocessor, in a single integrated circuit. It should be appreciated, however, that any known or conventional type of hardware can be used.

Additionally, the invention may be a software program stored on a computer readable storage medium (e.g., ROM) and executed by the processor. The stored information can be stored on a floppy disk, CD-ROM, RAM, HDD or any other suitable medium. The stored information could be in a table, database, or data structure suitable for use in storing pixel information with an increased depth (to store X parallax information).

Having described specific preferred embodiments of the invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A computer system comprising memory, a storage device, a display, and a processor in communication with the memory, the display, and the storage device, the processor configured with software to perform the acts of:
    acquiring a plurality of images;
    combining said plurality of images to form a single image, said single image comprising a plurality of pixels having pixel data;
    storing X parallax information with said pixel data of the single image in a memory device containing pixel data of said plurality of pixels;
    reconstructing a 3D image based on the stored pixel data and X parallax information; and
    displaying the reconstructed 3D image on the display.

2. The computer system of claim 1, wherein storing comprises expanding a pixel depth of each of said plurality of pixels to accommodate respective X parallax information.

3. The computer system of claim 1, wherein the pixel data comprises a location and a color for each pixel.

4. The computer system of claim 1, wherein said plurality of images comprises two images.

5. The computer system of claim 1, wherein said plurality of images comprises more than two images.

6. The computer system of claim 1, wherein the combining act comprises aligning points of said plurality of images.

7. The computer system of claim 1, wherein said single image comprises an image mosaic.

8. The computer system of claim 1, wherein said single image comprises a partial image.

9. The computer system of claim 1, wherein the storing act comprises storing X parallax information for each pixel.

10. The computer system of claim 1, wherein the storing act comprises storing X parallax information for a pixel array.

* * * * *